(12) United States Patent
Park et al.

(10) Patent No.: US 10,851,875 B1
(45) Date of Patent: Dec. 1, 2020

(54) POWER TRANSMISSION APPARATUS FOR HYBRID ELECTRIC VEHICLE

(71) Applicants: Hyundai Motor Company, Seoul (KR); Kia Motors Corporation, Seoul (KR)

(72) Inventors: Juhyeon Park, Uiryeong-Eup (KR); Yong Uk Shin, Suwon-si (KR); Seongwook Ji, Gunpo-si (KR); Ki Tae Kim, Incheon (KR); Woochurl Son, Seongnam-si (KR); Wonmin Cho, Hwaseong-si (KR); Ilhan Yoo, Hwaseong-si (KR); Woo Jin Chang, Suwon-si (KR); Seong Wook Hwang, Gunpo-si (KR); Chon Ok Kim, Yongin-si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 0 days.

(21) Appl. No.: 16/536,182

(22) Filed: Aug. 8, 2019

(30) Foreign Application Priority Data

Jun. 3, 2019 (KR) .......................... 10-2019-0065340

(51) Int. Cl.
*F16H 3/72* (2006.01)
*B60K 6/387* (2007.10)
(Continued)

(52) U.S. Cl.
CPC ............. *F16H 3/724* (2013.01); *B60K 6/387* (2013.01); *F16H 3/006* (2013.01); *F16H 37/046* (2013.01); *F16H 2037/047* (2013.01)

(58) Field of Classification Search
CPC .......... F16H 3/006; F16H 3/724; F16H 3/725; F16H 2003/007; F16H 2003/008;
(Continued)

(56) References Cited

U.S. PATENT DOCUMENTS

| 8,323,142 B2 | 12/2012 | Masumoto |
| 2013/0031990 A1 | 2/2013 | Singh et al. |

(Continued)

FOREIGN PATENT DOCUMENTS

EP 3 121 483 A1 1/2017

*Primary Examiner* — David R Morris
*Assistant Examiner* — Lori Wu
(74) *Attorney, Agent, or Firm* — Morgan, Lewis & Bockius LLP

(57) ABSTRACT

A power transmission apparatus may include a motor/generator having a rotor selectively connectable to an engine output shaft, a first input shaft mounted coaxial with the engine output shaft and selectively connectable to the rotor, a second input shaft external to the first input shaft and fixedly connected to the rotor, an intermediate shaft parallel with the input shafts, first and second output shafts receiving torques from the first and second input shafts, and outputting a shifted torque based on the received torques, a planetary gear set mounted on the first output shaft, having a sun gear fixedly connected to the first output shaft, selectively receiving torques from the first and second input shafts and the intermediate shaft, and outputting a shifted torque based on the received torques to the first output shaft, and a plurality of gear sets allowing torque flows between the various shafts.

17 Claims, 8 Drawing Sheets

(51) Int. Cl.
*F16H 37/04* (2006.01)
*F16H 3/00* (2006.01)

(58) Field of Classification Search
CPC ............. F16H 37/046; F16H 2037/047; F16H 2037/048; B60K 6/365; B60K 6/387; B60K 6/547; B60K 2006/4816; B60K 2006/4825
See application file for complete search history.

(56) References Cited

U.S. PATENT DOCUMENTS

| | | | |
|---|---|---|---|
| 2015/0298536 A1* | 10/2015 | Markl ..................... | B60K 6/48 475/5 |
| 2015/0321662 A1* | 11/2015 | Park ........................ | B60K 6/48 475/5 |
| 2016/0052381 A1* | 2/2016 | Kaltenbach ............. | B60K 6/38 180/65.23 |
| 2016/0102742 A1* | 4/2016 | Lee ......................... | B60K 6/48 475/5 |
| 2016/0312857 A1* | 10/2016 | Wechs ..................... | F16H 3/54 |

* cited by examiner

FIG. 2

| | Shift-stages | Engagement elements | | | | |
|---|---|---|---|---|---|---|
| | | ECL | CL1 | CL2 | CL3 | CL4 |
| Engine mode / Parallel mode | FD1 | ● | ● | | | ● |
| | FD2 | ● | | ● | | ● |
| | FD3 | ● | | | ● | ● |
| | FD4 | ● | | ● | ● | |
| | FD5 | ● | ● | | ● | |
| EV mode | FD1 | | ● | | | ● |
| | FD2 | | | ● | | ● |
| | FD3 | | | | ● | ● |
| | FD4 | | | ● | ● | |
| | FD5 | | ● | | ● | |

FIG. 4

| | Shift-stages | Engagement elements | | | | | |
|---|---|---|---|---|---|---|---|
| | | ECL | CL1 | CL2 | CL3 | CL4 | B1 |
| Engine mode / Parallel mode | FD1 | ● | ● | | | ● | |
| | FD2 | ● | | ● | | ● | |
| | FD3 | ● | | | ● | ● | |
| | FD4 | ● | | ● | ● | | |
| | FD5 | ● | ● | | ● | | |
| | FD6 | ● | | | ● | | ● |
| EV mode | FD1 | | ● | | | ● | |
| | FD2 | | | ● | | ● | |
| | FD3 | | | | ● | ● | |
| | FD4 | | | ● | ● | | |
| | FD5 | | ● | | ● | | |
| | FD6 | | | | ● | | ● |

FIG. 6

| Shift-stages | | Engagement elements | | | | | SN1 | | SN2 | |
|---|---|---|---|---|---|---|---|---|---|---|
| | | ECL | CL1 | CL2 | CL3 | CL4 | EG1 | N | EG3 | N |
| Engine mode / Parallel mode | FD1 | ● | ● | | | ● | ● | | ○ | ● |
| | FD2 | ● | | ● | | ● | ○ | ● | ● | |
| | FD3 | ● | | | ● | ● | ○ | ● | ○ | ● |
| | FD4 | ● | | ● | ● | | ○ | ● | ● | |
| | FD5 | ● | ● | | ● | | ● | | ○ | ● |
| EV mode | FD1 | | ● | | | ● | ● | | ○ | ● |
| | FD2 | | | ● | | ● | ○ | ● | ● | |
| | FD3 | | | | ● | ● | ○ | ● | ○ | ● |
| | FD4 | | | ● | ● | | ○ | ● | ● | |
| | FD5 | | ● | | ● | | ● | | ○ | ● |

○ : Preliminary engagement available

FIG. 8

| | Shift-stages | Engagement elements | | | | | | SN1 | | SN2 | |
|---|---|---|---|---|---|---|---|---|---|---|---|
| | | ECL | CL1 | CL2 | CL3 | CL4 | B1 | EG1 | N | EG3 | N |
| Engine mode / Parallel mode | FD1 | ● | ● | | | ● | | ● | | ○ | ● |
| | FD2 | ● | | ● | | ● | | ○ | ● | ● | |
| | FD3 | ● | | | ● | ● | | ○ | ● | ○ | ● |
| | FD4 | ● | | ● | ● | | | ○ | ● | ● | |
| | FD5 | ● | ● | | ● | | | ● | | ○ | ● |
| | FD6 | ● | | | ● | | ● | ○ | ● | ○ | ● |
| EV mode | FD1 | | ● | | | ● | | ● | | ○ | ● |
| | FD2 | | | ● | | ● | | ○ | ● | ● | |
| | FD3 | | | | ● | ● | | ○ | ● | ○ | ● |
| | FD4 | | | ● | ● | | | ○ | ● | ● | |
| | FD5 | | ● | | ● | | | ● | | ○ | ● |
| | FD6 | | | | ● | | ● | ○ | ● | ○ | ● |

○ : Preliminary engagement available

POWER TRANSMISSION APPARATUS FOR HYBRID ELECTRIC VEHICLE

CROSS-REFERENCE TO RELATED APPLICATION

The present application claims priority to Korean Patent Application No. 10-2019-0065340 filed on Jun. 3, 2019, the entire contents of which is incorporated herein for all purposes by this reference.

BACKGROUND OF THE INVENTION

Field of the Invention

The present invention relates to a power transmission apparatus according to a hybrid vehicle.

Description of Related Art

An environmentally-friendly technology of a vehicle is a core technology which controls survival of a future vehicle industry, and advanced vehicle makers have focused their energy on the development of an environmentally-friendly vehicle to achieve environmental and fuel efficiency regulations.

An electric vehicle (EV) or a hybrid electric vehicle (HEV) that utilizes electrical energy, or a double clutch transmission (DCT) improving efficiency and convenience of a transmission may be examples of such a future vehicle technology.

The double clutch transmission (DCT) may include two clutches devices and a gear train of a basically manual transmission, selectively transmits a torque input from an engine to two input shafts by use of the two clutches devices, and outputs a torque shifted by the gear train.

Such a double clutch transmission (DCT) attempts to compactly realize a multi-stage transmission of more than five speeds. The dual-clutch transmission (DCT) achieves an automated manual transmission (AMT) that removes the inconvenience of a manual shifting of a driver, by controlling two clutches and synchronizing devices by a controller.

In comparison with an automatic transmission using planetary gears, such a DCT shows merits, such as higher efficiency in power delivery, easier modification in revising or adding parts to achieve more shifting stages, etc., and thus gathers more spotlight since it can more comfortably conform to fuel consumption regulation and efficiency in achieving more shifting stages.

The information included in this Background of the present invention section is only for enhancement of understanding of the general background of the present invention and may not be taken as an acknowledgement or any form of suggestion that this information forms the prior art already known to a person skilled in the art.

BRIEF SUMMARY

Various aspects of the present invention are directed to providing a power transmission apparatus configured for a vehicle for a hybrid vehicle, which may include a motor/generator having a rotor selectively connectable to an engine output shaft, a first input shaft mounted coaxial with the engine output shaft and selectively connectable to the rotor, a second input shaft formed as a hollow shaft, mounted coaxial with and external to the first input shaft, and fixedly connected to the rotor, an intermediate shaft mounted in parallel with the first input shaft, a first output shaft mounted in parallel with the first input shaft, receiving torques from the first and second input shafts, and outputting a shifted torque based on the received torques, a second output shaft mounted in parallel with the first input shaft, receiving torques from the first input shaft, and outputting a shifted torque based on the received torques, a planetary gear set mounted on the first output shaft, having a sun gear fixedly connected to the first output shaft, selectively receiving torques from the first and second input shafts and the intermediate shaft, and outputting a shifted torque based on the received torques to the first output shaft, and a plurality of gear sets, each of which allows at least one torque flow between the first and second input shafts, the intermediate shaft, and the first and second output shafts.

The planetary gear set may be formed as a single pinion planetary gear set.

The plurality of gear sets may include first to fourth gear sets. The first gear set may include a third external gear and a second external gear, the third external gear being fixedly connected to the first input shaft, the second external gear being fixedly connected to the intermediate shaft and externally gear-meshed with the third external gear. The second gear set may include a first input gear, a fourth external gear, and a fifth external gear, the first input gear being fixedly connected to the first input shaft, the fourth external gear being rotatably mounted on the first output shaft, externally gear-meshed with the first input gear, and selectively connectable to a ring gear of the planetary gear set, the fifth external gear being rotatably mounted on the second output shaft, externally gear-meshed with the first input gear, and selectively connectable to the second output shaft. The third gear set may include a second input gear, a first external gear, and a sixth external gear, the second input gear being fixedly connected to the second input shaft, the first external gear being rotatably mounted on the intermediate shaft, externally gear-meshed with the second input gear, and selectively connectable to the intermediate shaft, the sixth external gear being rotatably mounted on the first output shaft, externally gear-meshed with the second input gear, and fixedly connected to a planet carrier of the planetary gear set. The fourth gear set may include a final reduction gear of a differential and first and second output gears, the first and second output gears being fixedly connected to the first and second output shafts respectively and externally gear-meshed with the final reduction gear respectively.

An exemplary embodiment of the present invention may further include five clutches, each of which selectively allows the at least one torque flow. The five clutches may include an engine clutch mounted between the engine output shaft and the second input shaft, a first clutch mounted between the first external gear and the intermediate shaft, a second clutch mounted between the first input shaft and the second input shaft, a third clutch mounted between the fourth external gear and the ring gear, and a fourth clutch mounted between the fifth external gear and the second output shaft.

The fourth clutch may be formed as a teeth engagement clutch.

An exemplary embodiment of the present invention may further include a brake between the intermediate shaft and a transmission housing. The planetary gear set may be mounted between the second gear set and the third gear set.

The plurality of gear sets may include first to fourth gear sets. The first gear set may include a third external gear and a second external gear, the third external gear being selectively connectable to the first input shaft, the second external gear being fixedly connected to the intermediate shaft and externally gear-meshed with the third external gear. The second gear set may include a first input gear, a fourth external gear, and a fifth external gear, the first input gear being selectively connectable to the first input shaft, the fourth external gear being rotatably mounted on the first output shaft, externally gear-meshed with the first input gear, and selectively connectable to a ring gear of the planetary gear set, the fifth external gear being rotatably mounted on the second output shaft, externally gear-meshed with the first input gear, and selectively connectable to the second output shaft. The third gear set may include a second input gear, a first external gear, and a sixth external gear, the second input gear being fixedly connected to the second input shaft, the first external gear being rotatably mounted on the intermediate shaft, externally gear-meshed with the second input gear, and selectively connectable to the intermediate shaft, the sixth external gear being rotatably mounted on the first output shaft, externally gear-meshed with the second input gear, and fixedly connected to a planet carrier of the planetary gear set. The fourth gear set may include a final reduction gear of a differential and first and second output gears, the first and second output gears being fixedly connected to the first and second output shafts respectively and externally gear-meshed with the final reduction gear respectively.

The first external gear may be selectively connectable to the intermediate shaft by a first synchronizer. The first input gear and the third external gear may be fixedly connected to each other. The first input gear and the third external gear may be selectively connectable to the first input shaft simultaneously by a second synchronizer.

An exemplary embodiment of the present invention may further include five clutches, each of which selectively allows the at least one torque flow. The five clutches may include an engine clutch mounted between the engine output shaft and the second input shaft, a first clutch mounted between the first external gear and the first synchronizer, a second clutch mounted between the first input shaft and the second input shaft, a third clutch mounted between the fourth external gear and the ring gear, and a fourth clutch mounted between the fifth external gear and the second output shaft.

The fourth clutch may be formed as a teeth engagement clutch.

An exemplary embodiment of the present invention may further include a brake between the intermediate shaft and a transmission housing.

According to an exemplary embodiment of the present invention, multiple shifting stages may be realized by applying a planetary gear set to a dual clutch type transmission, and by further employing a motor/generator, an electric vehicle mode and a parallel hybrid mode may be realized to the multiple shifting stages.

Therefore, an internal structure may be simplified, shifting efficiency may be improved, and an overall weight may be decreased, improving an installability and fuel consumption characteristics.

According to various exemplary embodiments of the present invention, operational reliability of first forward, second, fourth, and fifth shifting stages may be enhanced by additionally including synchronizers on the intermediate shaft and the first input shaft.

Furthermore, the sixth forward speed FD6 may further realize by additionally employing a brake B1, facilitating six forward speeds in total.

Furthermore, effects which may be obtained or expected from exemplary embodiments of the present invention are directly or suggestively described in the following detailed description. That is, various effects expected from exemplary embodiments of the present invention will be described in the following detailed description.

The methods and apparatuses of the present invention have other features and advantages which will be apparent from or are set forth in more detail in the accompanying drawings, which are incorporated herein, and the following Detailed Description, which together serve to explain certain principles of the present invention.

BRIEF DESCRIPTION OF THE DRAWINGS

FIG. 2 is a shifting operation chart for power transmission apparatus configured for a hybrid vehicle according to various exemplary embodiments of the present invention.

FIG. 4 is a shifting operation chart for power transmission apparatus configured for a hybrid vehicle according to various exemplary embodiments of the present invention.

FIG. 6 is a shifting operation chart for a power transmission apparatus configured for a hybrid vehicle according to various exemplary embodiments of the present invention.

FIG. 8 is a shifting operation chart for a power transmission apparatus configured for a hybrid vehicle according to various exemplary embodiments of the present invention.

Figure 1:
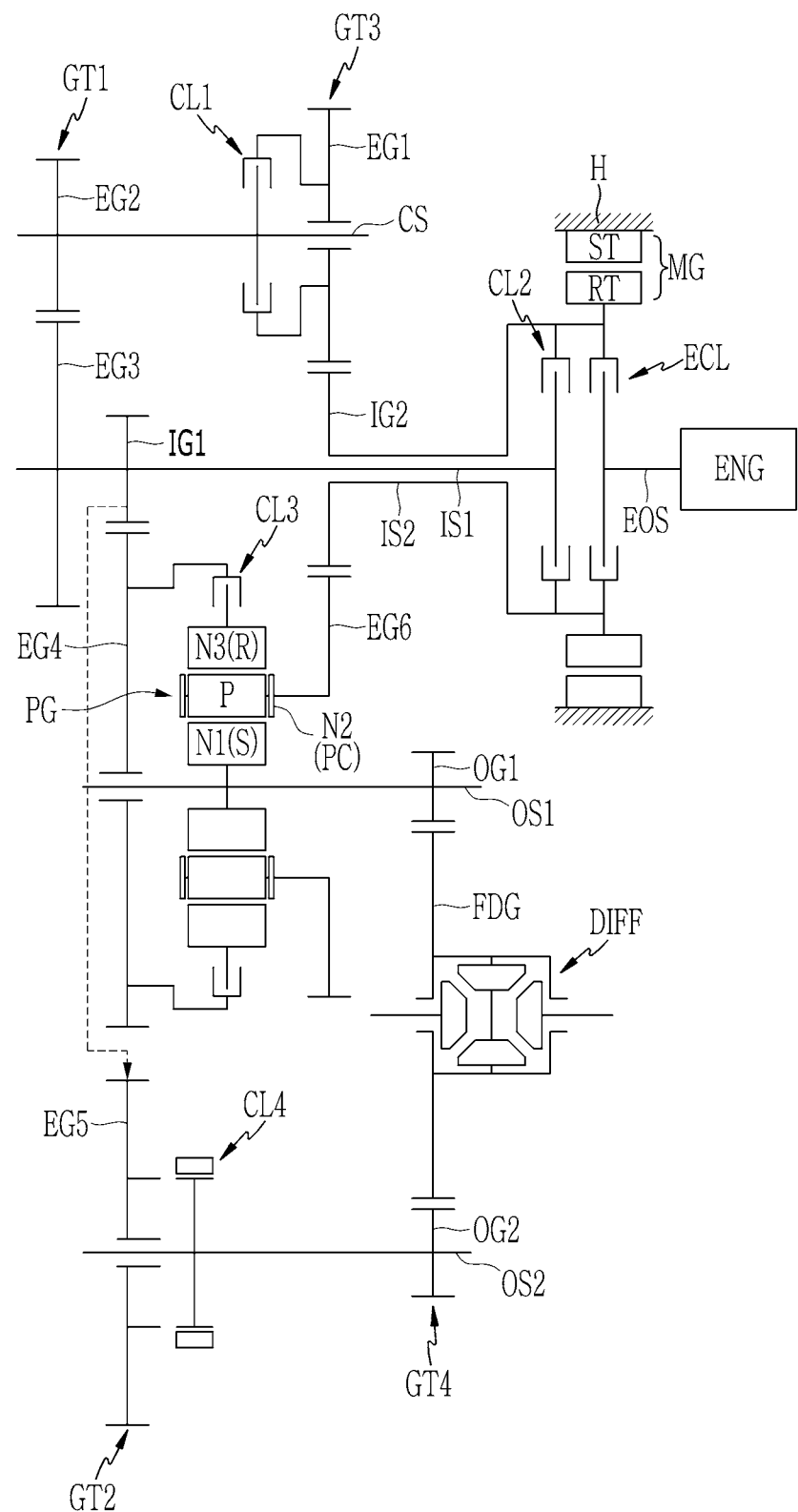
FIG. 1 is a schematic view of power transmission apparatus configured for a hybrid vehicle according to various exemplary embodiments of the present invention.

It may be understood that the appended drawings are not necessarily to scale, presenting a somewhat simplified representation of various features illustrative of the basic principles of the present invention. The specific design features of the present invention as included herein, including, for example, specific dimensions, orientations, locations, and shapes will be determined in part by the particularly intended application and use environment.

In the figures, reference numbers refer to the same or equivalent portions of the present invention throughout the several figures of the drawing.

DETAILED DESCRIPTION

Reference will now be made in detail to various embodiments of the present invention(s), examples of which are illustrated in the accompanying drawings and described below. While the present invention(s) will be described in conjunction with exemplary embodiments of the present invention, it will be understood that the present description is not intended to limit the present invention(s) to those exemplary embodiments. On the other hand, the present invention(s) is/are intended to cover not only the exemplary embodiments of the present invention, but also various alternatives, modifications, equivalents and other embodiments, which may be included within the spirit and scope of the present invention as defined by the appended claims.

Exemplary embodiments of the present application will be described more fully hereinafter with reference to the accompanying drawings, in which exemplary embodiments of the present invention are shown. As those skilled in the art would realize, the described embodiments may be modified in various different ways, all without departing from the spirit or scope of the present invention.

The drawings and description are to be regarded as illustrative in nature and not restrictive, and like reference numerals designate like elements throughout the specification.

In the following description, dividing names of components into first, second and the like is to divide the names because the names of the components are the same as each other and an order thereof is not particularly limited.

FIG. 1 is a schematic view of power transmission apparatus configured for a hybrid vehicle according to various exemplary embodiments of the present invention.

Referring to FIG. 1, a power transmission apparatus according to various exemplary embodiments of the present invention shifts torques of power sources of an engine ENG and the motor/generator MG and includes first and second input shafts IS1 and IS2, an intermediate shaft CS, first and second output shafts OS1 and OS2, planetary gear set PG and a plurality of gear sets GT1, GT2, GT3, and GT4.

A power source of the power transmission apparatus may be various types of a known engine ENG, such as a gasoline engine or a diesel engine.

The motor/generator MG may act as a motor and also as a generator, and includes a stator ST and a rotor RT, where the stator ST is fixed to the transmission housing H and the rotor RT is rotatably supported within the stator ST.

The torques of the engine ENG and the motor/generator MG transmitted to the first input shaft IS1 and the second input shaft IS2 are shifted by the first to third gear sets GT1 to GT3 and a planetary gear set PG into a plurality of shifting stages, and outputted to first and second output shafts OS1 and OS2.

The first and second input shafts IS1 and IS2 are mounted on a same axis, and the intermediate shaft CS and the first and second output shafts OS1 and OS2 are mounted in parallel with the first input shaft IS1.

The first input shaft IS1 is mounted along an axis of an engine output shaft EOS, selectively connectable to the engine output shaft EOS, and also selectively connectable to the rotor RT of the motor/generator MG.

That is, the first input shaft IS1 selectively receives the torque of the engine ENG and the torque of the motor/generator MG.

The second input shaft IS2 is formed as a hollow shaft and mounted coaxial with and external to the first input shaft IS1 without rotational interference therebetween, fixedly connected to the rotor RT of the motor/generator MG and selectively connectable to the first input shaft IS1. Thus, the second input shaft IS2 selectively receives the torque of the engine ENG and always receives the torque of the motor/generator MG.

The motor/generator MG is mounted on an axis of the engine output shaft EOS, fixedly connected to the second input shaft IS2, and selectively connectable to the first input shaft IS1.

The intermediate shaft CS is mounted in parallel with the first input shaft IS1, and connected to the first and second input shafts IS1 and IS2 through external gear engagements.

The first output shaft OS1 is mounted in parallel with the first input shaft IS1. The first output shaft OS1 receives a shifted torque from the first and second input shafts IS1 and IS2 through the second gear set GT2 and the third gear set GT3, and transmits the received torques to a differential DIFF through a first output gear OG1 and a final reduction gear FDG.

The second output shaft OS2 is mounted in parallel with the first input shaft IS1. The second output shaft OS2 receives a shifted torque from the first input shaft IS1 through the second gear set GT2, and transmits the received torques to a differential DIFF through a second output gear OG2 and a final reduction gear FDG.

The planetary gear set PG is mounted on an axis of the first output shaft OS1, and fixedly connected to the first output shaft OS1 through a first rotation element N1 (sun gear S). The planetary gear set PG forms a shifted torque by combining the torques selectively received from the first and second input shafts IS1 and IS2, and outputs the shifted torque to the first output shaft OS1.

The planetary gear set PG is a single pinion planetary gear set, and includes a sun gear S, a planet carrier PC rotatably supporting a plurality of pinion gear P externally gear-meshed with the sun gear S, and a ring gear R internally gear-meshed with the plurality of pinion gear P. The sun gear S acts as a first rotation element N1, the planet carrier PC acts as a second rotation elements N2, and the ring gear R acts as a third rotation elements N3, respectively of the planetary gear set PG.

The plurality of gear sets are mounted over the first and second input shafts IS1 and IS2, the intermediate shaft CS, and the first and second output shafts OS1 and OS2, and form multiple shifted torques from the torques of the first and second input shafts IS1 and IS2.

In more detail, the plurality of gear sets include first, second, third and fourth gear sets GT1, GT2, GT3, and GT4 that are mounted over the first and second input shafts IS1 and IS2, the intermediate shaft CS, and the first and second output shafts OS1 and OS2.

The first gear set GT1 includes a third external gear EG3 and a second external gear EG2. The third external gear EG3 is fixedly connected to the first input shaft IS1. The second external gear EG2 is fixedly connected to the intermediate shaft CS and externally gear-meshed with the third external gear EG3.

The second gear set GT2 includes a first input gear IG1, a fourth external gear EG4, and a fifth external gear EG5. The first input gear IG1 is fixedly connected to the first input shaft IS1. The fourth external gear EG4 is rotatably mounted on the first output shaft OS1, externally gear-meshed with the first input gear IG1, and selectively connectable to the ring gear R of the planetary gear set PG The fifth external gear EG5 is rotatably mounted on the second output shaft OS2, externally gear-meshed with the first input gear IG1, and selectively connectable to the second output shaft OS2.

The third gear set GT3 includes a second input gear IG2, a first external gear EG1, and a sixth external gear EG6. The second input gear IG2 is fixedly connected to the second input shaft IS2. The first external gear EG1 is rotatably mounted on the intermediate shaft CS, externally gear-meshed with the second input gear IG2, selectively connectable to the intermediate shaft CS. The sixth external gear EG6 is rotatably mounted on the first output shaft OS1, externally gear-meshed with the second input gear IG2, and fixedly connected to the planet carrier PC of the planetary gear set PG.

The fourth gear set GT4 includes the final reduction gear FDG and first and second output gears OG1 and OG2. The final reduction gear FDG is fixed to the differential DIFF. The first and second output gears OG1 and OG2 are fixedly connected to the first and second output shafts OS1 and OS2 respectively and externally gear-meshed with the final reduction gear FDG.

The planetary gear set PG is mounted between the second gear set GT2 and the third gear set GT3, where the planet carrier PC is fixedly connected to the sixth external gear EG6 of the third gear set GT3, and the ring gear R is fixedly connected to the fourth external gear EG4 of the second gear set GT2.

Gear ratios of drive and driven gears of the first, second, third and fourth gear sets GT1, GT2, GT3, and GT4 may be appropriately set according to desired feature of the transmission.

Furthermore, engagement elements of five clutches ECL, CL1, CL2, CL3, and CL4 are mounted between rotation members such as various shafts.

The engine clutch ECL is mounted between the engine output shaft EOS and the second input shaft IS2, and selectively connects the engine output shaft EOS and the second input shaft IS2, controlling torque transmission therebetween.

The first clutch CL1 is mounted between the first external gear EG1 and the intermediate shaft CS, and selectively connects the first external gear EG1 and the intermediate shaft CS, controlling torque transmission therebetween.

The second clutch CL2 is mounted between the first input shaft IS1 and the second input shaft IS2, and selectively connects the first input shaft IS1 and the second input shaft IS2, controlling torque transmission therebetween.

the third clutch CL3 is mounted between the fourth external gear EG4 and the ring gear R, and selectively connects the fourth external gear EG4 and the ring gear R, controlling torque transmission therebetween.

the fourth clutch CL4 is mounted between the fifth external gear EG5 and the second output shaft OS2, and selectively connects the fifth external gear EG5 and the second output shaft OS2, controlling torque transmission therebetween.

The engagement elements of the engine clutch ECL and the first, second, third, and fourth clutches C1, C2, C3, and C4 may be realized as multi-plate hydraulic pressure friction devices that are frictionally engaged by hydraulic pressure, however, it may not be understood to be limited thereto, since various other configuration that are electrically controllable may be available.

In the disclosure, when two or more members are described to be "fixedly connected", where the member may be any of a shaft, an input shaft, an output shaft, a rotation member, and a transmission housing, it means that the fixedly connected members always rotate at a same speed. That is, rotation elements and/or shafts fixedly interconnected rotate in a same rotating direction and at a same rotation speed.

When two or more members are described to be "selectively connectable" by an engagement element, it means that the selectively connectable members rotate separately when the engagement element is not engaged, and rotates at a same speed when the engagement element is engaged. It may be understood that in the case that a member is "selectively connectable" with a transmission housing by an engagement element, the member may be stationary when the engagement element is engaged.

In an example, the fourth clutch CL4 may be formed as a teeth engagement clutch, which is also referred to as a dog clutch, improving torque transmission efficiency to the output shaft OS, and reducing a length of a transmission.

The plurality of gear sets may be mounted in an order of the first, second, third, and fourth gear sets GT1, GT2, GT3, and GT4 from an opposite side of the engine output shaft EOS FIG. 2 is a shifting operation chart for a power transmission apparatus configured for a hybrid vehicle according to various exemplary embodiments of the present invention, and the power transmission apparatus according to various exemplary embodiments performs shifting operation as follows.

[The First Forward Speed]

In the first forward speed FD1 in an engine mode, as shown in FIG. 2, the engine clutch ECL and the first and fourth clutches CL1 and CL4 are simultaneously operated As a result, by the operation of the engine clutch ECL and the first clutch CL1, the torque of the engine ENG passes through the engine output shaft EOS, the second input shaft IS2, the third gear set GT3, the intermediate shaft CS, the first gear set GT1, the first input shaft IS1, and the second gear set GT2.

As such, the torque received at the second gear set GT2 is transmitted to the differential DIFF through the second output shaft OS2 by the operation of the fourth clutch CL4, realizing the first forward speed.

The first forward speed FD1 is described in connection with the engine mode where a vehicle is driven by the torque of the engine ENG, however, the parallel hybrid mode may also be available by merely additionally operating the motor/generator MG to supply an assistant torque.

Furthermore, when the motor/generator MG is operated while the engine clutch ECL is released and the engine ENG is stopped, a vehicle may be driven in the first forward speed FD1 in an electric vehicle mode (EV mode) by the driving torque of the motor/generator MG In the instant case, the reverse speed may be realized by operating the motor/generator MG in a reverse direction thereof.

The shifting operation for the first forward speed FD1 in the electric vehicle mode (EV mode) may be the same as in the first forward speed FD1 in the engine mode, which is therefore not described in further detail.

[The Second Forward Speed]

In the second forward speed FD2 in an engine mode, as shown in FIG. 2, the engine clutch ECL and the second and fourth clutches CL2 and CL4 are simultaneously operated As a result, by the operation of the engine clutch ECL and the second clutch CL2, the torque of the engine ENG passes through the engine output shaft EOS, the first input shaft IS1, and the second gear set GT2.

As such, the torque received at the second gear set GT2 is transmitted to the differential DIFF through the output shaft OS by the operation of the fourth clutch CL4, realizing the second forward speed.

The second forward speed FD2 is described in connection with the engine mode where a vehicle is driven by the torque of the engine ENG, however, the parallel hybrid mode may also be available by merely additionally operating the motor/generator MG to supply an assistant torque.

Furthermore, when the motor/generator MG is operated while the engine clutch ECL is released and the engine ENG is stopped, a vehicle may be driven in the second forward speed FD2 in an electric vehicle mode (EV mode) by the driving torque of the motor/generator MG.

The shifting operation for the second forward speed FD2 in the electric vehicle mode (EV mode) may be the same as in the second forward speed FD2 in the engine mode, which is therefore not described in further detail.

[The Third Forward Speed]

In the third forward speed FD3 in an engine mode, as shown in FIG. 2, the engine clutch ECL and the third and fourth clutches CL3 and CL4 are simultaneously operated As a result, by the operation of the engine clutch ECL, the torque of the engine ENG passes through the engine output shaft EOS, the second input shaft IS2, and the third gear set GT3, and is transmitted to the planet carrier PC of the planetary gear set PG.

Furthermore, while the planetary gear set PG receives an input torque through the planet carrier PC, the second and fourth gear sets GT2 and GT4 are interconnected by the operation of the fourth clutch CL4, and the ring gear R of the planetary gear set PG is interconnected to the fourth external gear EG4 of the second gear set GT2 by the operation of the third clutch CL3. Therefore, the planetary gear set PG forms a closed torque loop between the sun gear S and the ring gear R, forming a shifted torque, and outputs the shifted torque to the differential DIFF through the first output shaft OS1, realizing the third forward speed FD3.

The third forward speed FD3 is described in connection with the engine mode where a vehicle is driven by the torque of the engine ENG, however, the parallel hybrid mode may also be available by merely additionally operating the motor/generator MG to supply an assistant torque.

Furthermore, when the motor/generator MG is operated while the engine clutch ECL is released and the engine ENG is stopped, a vehicle may be driven in the third forward speed FD3 in an electric vehicle mode (EV mode) by the driving torque of the motor/generator MG.

The shifting operation for the third forward speed FD3 in the electric vehicle mode (EV mode) may be the same as in the third forward speed FD3 in the engine mode, which is therefore not described in further detail.

[The Fourth Forward Speed]

In the fourth forward speed FD4 in an engine mode, as shown in FIG. 2, the engine clutch ECL and the second and third clutches CL2 and CL3 are simultaneously operated As a result, by the operation of the engine clutch ECL and the second clutch CL2, third clutch CL3, the torque of the engine ENG partially passes though the engine output shaft EOS, the first input shaft IS1, and the second gear set GT2, and is transmitted to the ring gear R of the planetary gear set PG.

Furthermore, by the operation of the engine clutch ECL, the torque of the engine ENG partially passes though the engine output shaft EOS, the second input shaft IS2, and the third gear set GT3, and is transmitted to the planet carrier PC of the planetary gear set PG.

As such, the planetary gear set PG forms a shifted torque by a rotation speed difference between the ring gear R and the planet carrier PC, and outputs the shifted toque to the differential DIFF through the first output shaft OS1 fixedly connected to the sun gear S, realizing the fourth forward speed FD4 in the engine mode.

The fourth forward speed FD4 is described in connection with the engine mode where a vehicle is driven by the torque of the engine ENG, however, the parallel hybrid mode may also be available by merely additionally operating the motor/generator MG to supply an assistant torque.

Furthermore, when the motor/generator MG is operated while the engine clutch ECL is released and the engine ENG is stopped, a vehicle may be driven in the fourth forward speed FD4 in an electric vehicle mode (EV mode) by the driving torque of the motor/generator MG.

The shifting operation for the fourth forward speed FD4 in the electric vehicle mode (EV mode) may be the same as in the fourth forward speed FD4 in the engine mode, which is therefore not described in further detail.

[The Fifth Forward Speed]

In the fifth forward speed FD5 in an engine mode, as shown in FIG. 2, the engine clutch ECL and the first and third clutches CL1 and CL3 are simultaneously operated As a result, by the operation of the engine clutch ECL, the first clutch CL1, and the third clutch CL3, the torque of the engine ENG partially passes through the engine output shaft EOS, the second input shaft IS2, and the third gear set GT3, an intermediate shaft CS, first gear set GT1, first input shaft IS1, second gear set GT2, and is transmitted to the ring gear R of the planetary gear set PG.

Furthermore, by the operation of the engine clutch ECL, the torque of the engine ENG partially passes though the engine output shaft EOS, the second input shaft IS2, and the third gear set GT3, and is transmitted to the planet carrier PC of the planetary gear set PG.

As such, the planetary gear set PG forms a shifted torque by a rotation speed difference between the ring gear R and the planet carrier PC, and outputs the shifted toque to the differential DIFF through the first output shaft OS1 fixedly connected to the sun gear S, realizing the fifth forward speed FD5 in the engine mode.

The fifth forward speed FD5 is described in connection with the engine mode where a vehicle is driven by the torque of the engine ENG, however, the parallel hybrid mode may also be available by merely additionally operating the motor/generator MG to supply an assistant torque.

Furthermore, when the motor/generator MG is operated while the engine clutch ECL is released and the engine ENG is stopped, a vehicle may be driven in the fifth forward speed FD5 in an electric vehicle mode (EV mode) by the driving torque of the motor/generator MG.

The shifting operation for the fifth forward speed FD5 in the electric vehicle mode (EV mode) may be the same as in the fifth forward speed FD5 in the engine mode, which is therefore not described in further detail.

Figure 3:
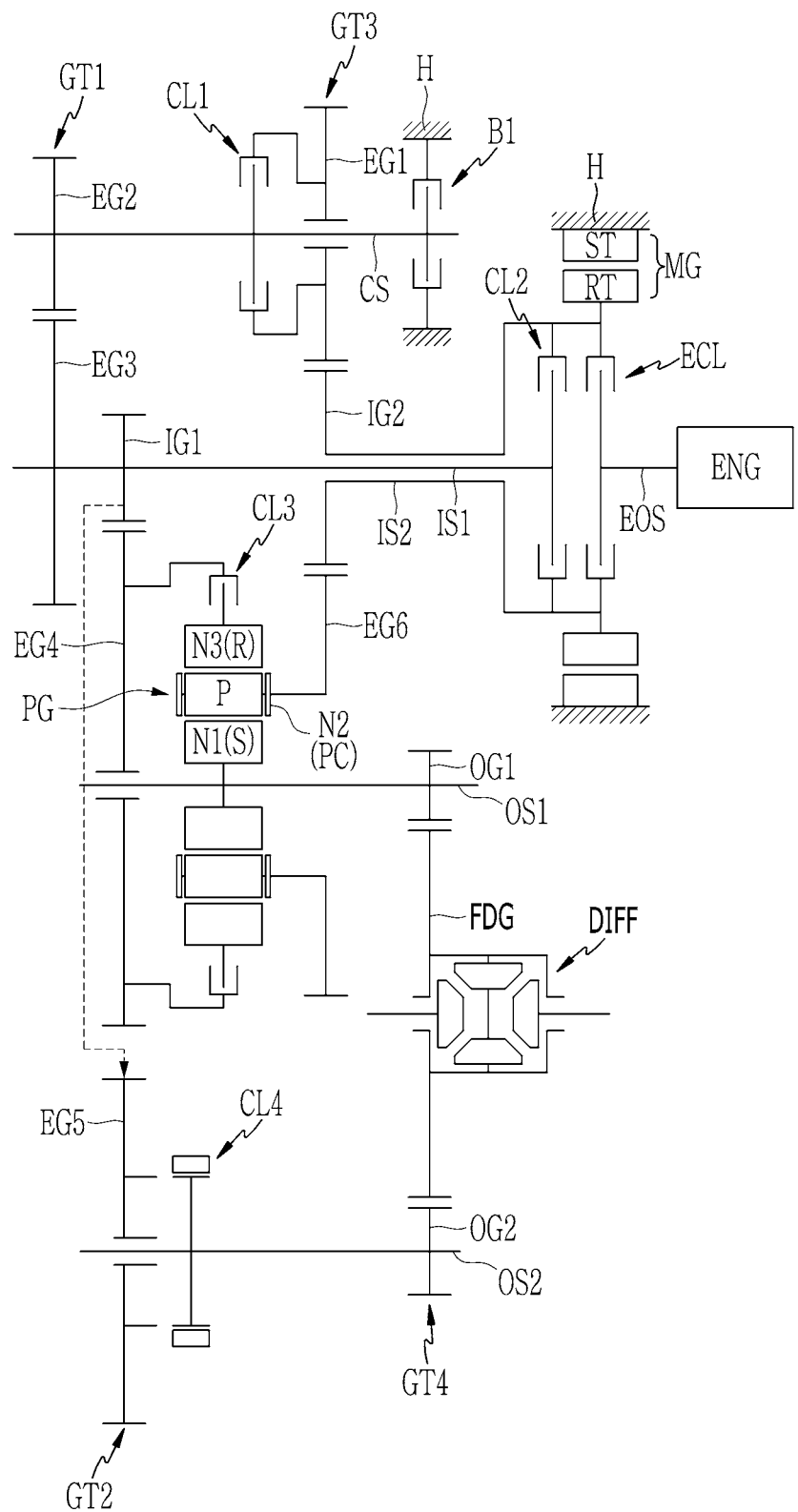
FIG. 3 is a schematic view of power transmission apparatus configured for a hybrid vehicle according to various exemplary embodiments of the present invention.

FIG. 3 is a schematic view of power transmission apparatus configured for a hybrid vehicle according to various exemplary embodiments of the present invention.

Referring to FIG. 3, a power transmission apparatus according to various exemplary embodiments differs from the various exemplary embodiments in that a brake B1 is further included between the intermediate shaft CS and the transmission housing H.

The brake B1 may stop the intermediate shaft CS, the first gear set GT1, the first input shaft IS1, and the second gear set GT2, and therefore, together with the operation of the third clutch CL3, may enable the ring gear R of the planetary gear set PG to act as a fixed element. Thus, it is notable that the location of the brake B1 suffices if the ring gear R may be stopped.

Such various exemplary embodiments of the present invention differs from the various exemplary embodiments substantially in that the brake B1 is further included.

FIG. 4 is a shifting operation chart for a power transmission apparatus configured for a hybrid vehicle according to various exemplary embodiments of the present invention, and the power transmission apparatus may performs shifting operation as follows.

The brake B1 employed in the various exemplary embodiments relates to realizing the sixth forward speed FD6, and the sixth forward speed is described in detail below with reference to FIG. 4.

The first forward speed FD1 to the fifth forward speed FD5 except the sixth forward speed FD6 may be the same as in the various exemplary embodiments.

[The Sixth Forward Speed]

In the sixth forward speed FD6 of the engine mode, the engine clutch ECL, the third clutch CL3, and the brake B1 are simultaneously operated.

As such, by the operation of the brake B1, the intermediate shaft CS, the first gear set GT1, the first input shaft IS1, and the second gear set GT2 are fixed, and by the operation of the third clutch CL3, the ring gear R of the planetary gear set PG acts as a fixed element.

As such, by the operation of the engine clutch ECL, the torque of the engine ENG passes through the engine output shaft EOS, the second input shaft IS2, and the third gear set GT3, and is transmitted to the planet carrier PC of the planetary gear set PG Thus, the planetary gear set PG outputs the shifted torque to the differential DIFF through the first output shaft OS1, realizing the sixth forward speed FD6.

The sixth forward speed FD6 is described in connection with the engine mode where a vehicle is driven by the torque of the engine ENG, however, the parallel hybrid mode may also be available by merely additionally operating the motor/generator MG to supply an assistant torque.

Furthermore, when the motor/generator MG is operated while the engine clutch ECL is released and the engine ENG is stopped, a vehicle may be driven in the third forward speed FD3 in an electric vehicle mode (EV mode) by the driving torque of the motor/generator MG.

The sixth forward speed FD6 in the electric vehicle mode (EV mode) may be realized the same as in the sixth forward speed FD6 in the engine mode.

Figure 5:
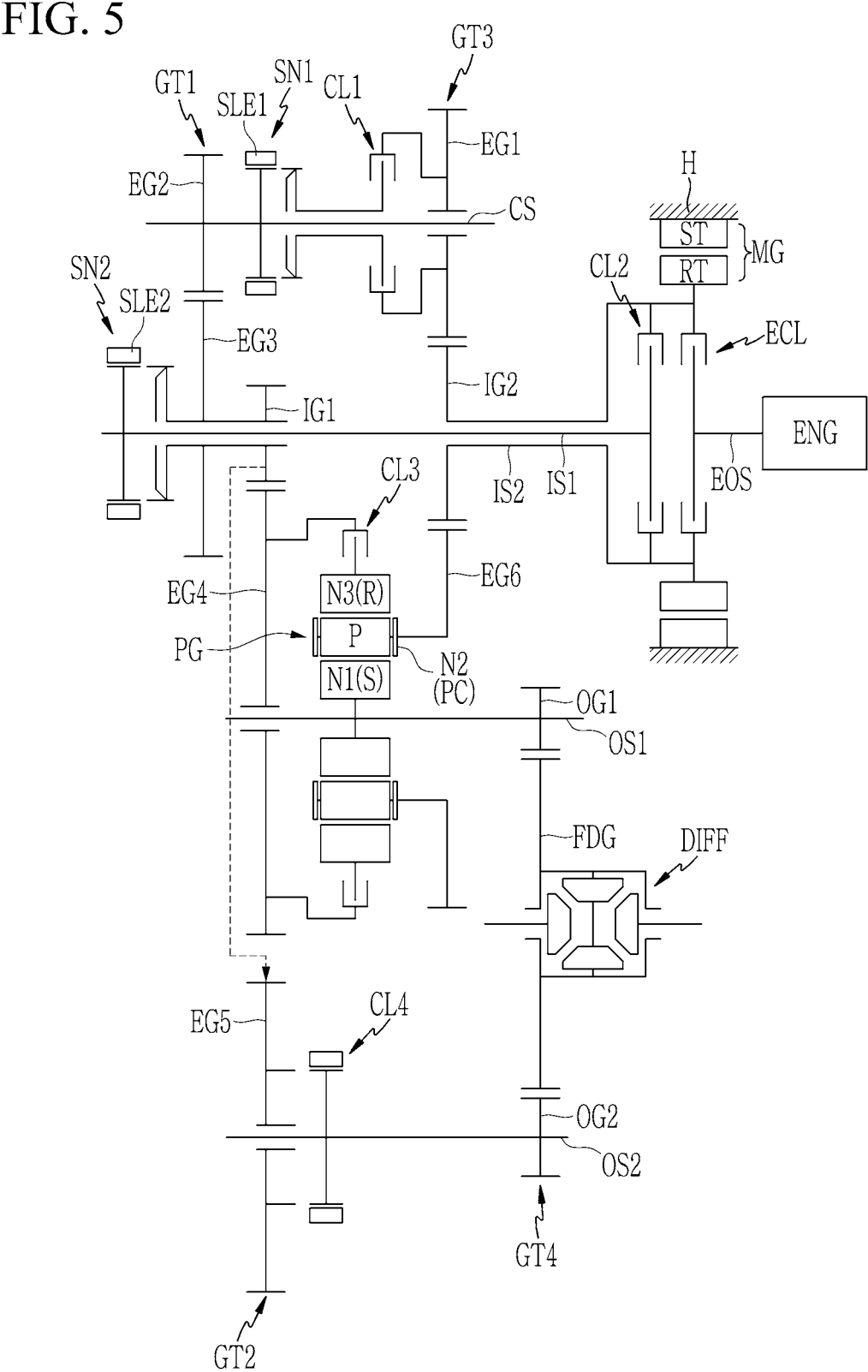
FIG. 5 is a schematic view of power transmission apparatus configured for a hybrid vehicle according to various exemplary embodiments of the present invention.

FIG. 5 is a schematic view of power transmission apparatus configured for a hybrid vehicle according to various exemplary embodiments of the present invention.

Referring to FIG. 5, a power transmission apparatus according to various exemplary embodiments differs from the various exemplary embodiments in that first and second synchronizers SN1 and SN2 are further included on the intermediate shaft CS and the first input shaft IS1 respectively.

The first synchronizer SN1 is mounted on the intermediate shaft CS, and selectively connects the first external gear EG1 to the intermediate shaft CS when the first clutch CL1 is being operated.

The second synchronizer SN2 is mounted on the first input shaft IS1, and selectively connects the first input gear IG1 and the third external gear EG3 to the first input shaft IS1.

Differently from various exemplary embodiments of the present invention, the first input gear IG1 and the third external gear EG3 are interconnected to each other and are rotatably mounted on the first input shaft IS1.

Such various exemplary embodiments of the present invention differs from the various exemplary embodiments substantially in that the first and second synchronizers SN1 and SN2 are further included.

The first and second synchronizers SN1 and SN2 may be formed as a known scheme, and first and second sleeves SLE1 and SLE2 applied to the first and second synchronizers SN1 and SN2 may be operated by actuators which may be controlled by a transmission control unit.

FIG. 6 is a shifting operation chart for a power transmission apparatus according to various exemplary embodiments of the present invention, and the power transmission apparatus may perform shifting operation as follows.

The shifting operation of the various exemplary embodiments is mostly the same as the various exemplary embodiments of the present invention, and the difference lies substantially in the operation of the first and second synchronizers SN1 and SN2.

[The First Forward Speed]

In the first forward speed FD1 in an engine mode, as shown in FIG. 6, the sleeve SLE1 of the first synchronizer SN1 is moved toward the third gear set GT3, and simultaneously, the engine clutch ECL and the first and fourth clutches CL1 and CL4 are operated.

As a result, by the operation of the engine clutch ECL, the first synchronizer SN1, and the first clutch CL1, the torque of the engine ENG passes through the engine output shaft EOS, the second input shaft IS2, the third gear set GT3, the intermediate shaft CS, the first gear set GT1, and the second gear set GT2.

As such, the torque received at the second gear set GT2 is transmitted to the differential DIFF through the second output shaft OS2 by the operation of the fourth clutch CL4, realizing the first forward speed.

The first forward speed FD1 is described in connection with the engine mode where a vehicle is driven by the torque of the engine ENG, however, the parallel hybrid mode may also be available by merely additionally operating the motor/generator MG to supply an assistant torque.

Furthermore, when the motor/generator MG is operated while the engine clutch ECL is released and the engine ENG is stopped, a vehicle may be driven in the first forward speed FD1 in an electric vehicle mode (EV mode) by the driving torque of the motor/generator MG In the instant case, the reverse speed may be realized by operating the motor/generator MG in a reverse direction thereof.

The shifting operation for the first forward speed FD1 in the electric vehicle mode (EV mode) may be the same as in the first forward speed FD1 in the engine mode, which is therefore not described in further detail.

[The Second Forward Speed]

In the second forward speed FD2 in an engine mode, as shown in FIG. 6, by the operation of the sleeve SLE2 of the second synchronizer SN2, the third external gear EG3 and the first input gear IG1 are synchronously connected to the first input shaft IS1, and simultaneously, the engine clutch ECL and the second and fourth clutches CL2 and CL4 are operated.

As a result, by the operation of the engine clutch ECL, the second synchronizer SN2, and the second clutch CL2, the torque of the engine ENG passes through the engine output shaft EOS, the first input shaft IS1, and the second gear set GT2.

As such, the torque received at the second gear set GT2 is transmitted to the differential DIFF through the output shaft OS by the operation of the fourth clutch CL4, realizing the second forward speed.

The second forward speed FD2 is described in connection with the engine mode where a vehicle is driven by the torque of the engine ENG, however, the parallel hybrid mode may also be available by merely additionally operating the motor/generator MG to supply an assistant torque.

Furthermore, when the motor/generator MG is operated while the engine clutch ECL is released and the engine ENG is stopped, a vehicle may be driven in the second forward speed FD2 in an electric vehicle mode (EV mode) by the driving torque of the motor/generator MG.

The shifting operation for the second forward speed FD2 in the electric vehicle mode (EV mode) may be the same as in the second forward speed FD2 in the engine mode, which is therefore not described in further detail.

[The Third Forward Speed]

In the third forward speed FD3 in an engine mode, as shown in FIG. 6, the engine clutch ECL and the third and fourth clutches CL3 and CL4 are simultaneously operated As a result, by the operation of the engine clutch ECL, the torque of the engine ENG passes through the engine output shaft EOS, the second input shaft IS2, and the third gear set GT3, and is transmitted to the planet carrier PC of the planetary gear set PG.

Furthermore, while the planetary gear set PG receives an input torque through the planet carrier PC, the second and fourth gear sets GT2 and GT4 are interconnected by the operation of the fourth clutch CL4, and the ring gear R of the planetary gear set PG is interconnected to the fourth external gear EG4 of the second gear set GT2 by the operation of the third clutch CL3. Therefore, the planetary gear set PG forms a closed torque loop between the sun gear S and the ring gear R, forming a shifted torque, and outputs the shifted torque to the differential DIFF through the first output shaft OS1, realizing the third forward speed FD3.

The third forward speed FD3 is described in connection with the engine mode where a vehicle is driven by the torque of the engine ENG, however, the parallel hybrid mode may also be available by merely additionally operating the motor/generator MG to supply an assistant torque.

Furthermore, when the motor/generator MG is operated while the engine clutch ECL is released and the engine ENG is stopped, a vehicle may be driven in the third forward speed FD3 in an electric vehicle mode (EV mode) by the driving torque of the motor/generator MG.

The shifting operation for the third forward speed FD3 in the electric vehicle mode (EV mode) may be the same as in the third forward speed FD3 in the engine mode, which is therefore not described in further detail.

[The Fourth Forward Speed]

In the fourth forward speed FD4 in an engine mode, as shown in FIG. 6, by the operation of the sleeve SLE2 of the second synchronizer SN2, the third external gear EG3 and the first input gear IG1 are synchronously connected to the first input shaft IS1, and simultaneously, the engine clutch ECL, second and third clutches CL2 and CL3 are operated.

As a result, by the operation of the engine clutch ECL, the second synchronizer SN2, the second clutch CL2, and the third clutch CL3, the torque of the engine ENG partially passes though the engine output shaft EOS, the first input shaft IS1, and the second gear set GT2, and is transmitted to the ring gear R of the planetary gear set PG.

Furthermore, by the operation of the engine clutch ECL, the torque of the engine ENG partially passes though the engine output shaft EOS, the second input shaft IS2, and the third gear set GT3, and is transmitted to the planet carrier PC of the planetary gear set PG.

As such, the planetary gear set PG forms a shifted torque by a rotation speed difference between the ring gear R and the planet carrier PC, and outputs the shifted toque to the differential DIFF through the first output shaft OS1 fixedly connected to the sun gear S, realizing the fourth forward speed FD4 in the engine mode.

The fourth forward speed FD4 is described in connection with the engine mode where a vehicle is driven by the torque of the engine ENG, however, the parallel hybrid mode may also be available by merely additionally operating the motor/generator MG to supply an assistant torque.

Furthermore, when the motor/generator MG is operated while the engine clutch ECL is released and the engine ENG is stopped, a vehicle may be driven in the fourth forward speed FD4 in an electric vehicle mode (EV mode) by the driving torque of the motor/generator MG.

The shifting operation for the fourth forward speed FD4 in the electric vehicle mode (EV mode) may be the same as in the fourth forward speed FD4 in the engine mode, which is therefore not described in further detail.

[The Fifth Forward Speed]

In the fifth forward speed FD5 in an engine mode, as shown in FIG. 6, the sleeve SLE1 of the first synchronizer SN1 is moved toward the third gear set GT3, and simultaneously, the engine clutch ECL and the first and third clutches CL1 and CL3 are operated.

As a result, by the operation of the engine clutch ECL, the first synchronizer SN1, the first clutch CL1, and the third clutch CL3, the torque of the engine ENG partially passes through the engine output shaft EOS, the second input shaft IS2, the third gear set GT3, the intermediate shaft CS, the first gear set GT1, the first input shaft IS1, and the second gear set GT2, and is transmitted to the ring gear R of the planetary gear set PG.

Furthermore, by the operation of the engine clutch ECL, the torque of the engine ENG partially passes though the engine output shaft EOS, the second input shaft IS2, and the third gear set GT3, and is transmitted to the planet carrier PC of the planetary gear set PG.

As such, the planetary gear set PG forms a shifted torque by a rotation speed difference between the ring gear R and the planet carrier PC, and outputs the shifted toque to the differential DIFF through the first output shaft OS1 fixedly connected to the sun gear S, realizing the fifth forward speed FD5 in the engine mode.

The fifth forward speed FD5 is described in connection with the engine mode where a vehicle is driven by the torque of the engine ENG, however, the parallel hybrid mode may also be available by merely additionally operating the motor/generator MG to supply an assistant torque.

Furthermore, when the motor/generator MG is operated while the engine clutch ECL is released and the engine ENG is stopped, a vehicle may be driven in the fifth forward speed FD5 in an electric vehicle mode (EV mode) by the driving torque of the motor/generator MG.

The shifting operation for the fifth forward speed FD5 in the electric vehicle mode (EV mode) may be the same as in the fifth forward speed FD5 in the engine mode, which is therefore not described in further detail.

Figure 7:
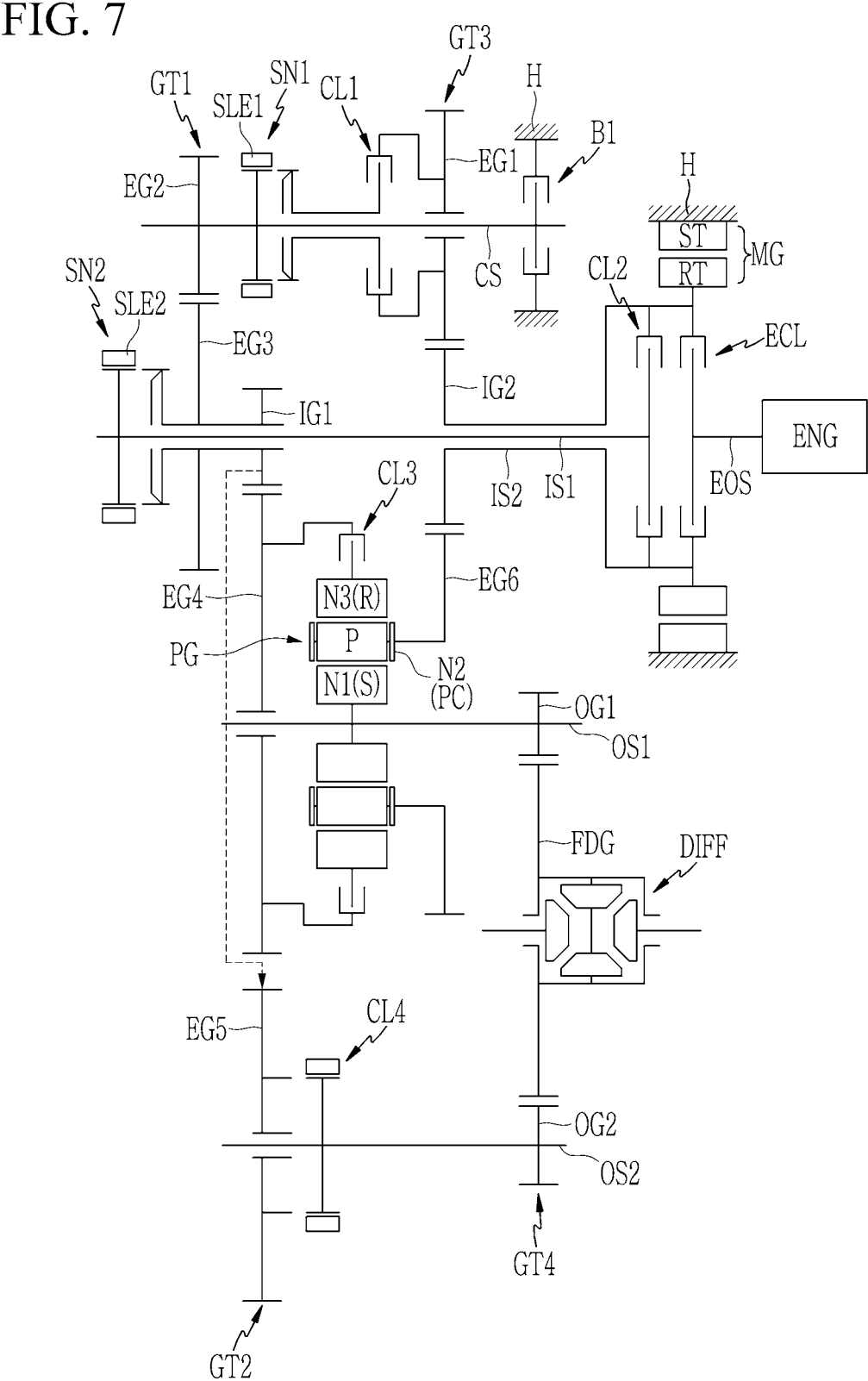
FIG. 7 is a schematic view of power transmission apparatus configured for a hybrid vehicle according to various exemplary embodiments of the present invention.

FIG. 7 is a schematic view of power transmission apparatus configured for a hybrid vehicle according to various exemplary embodiments of the present invention.

Referring to FIG. 3, a power transmission apparatus according to various exemplary embodiments differs from the various exemplary embodiments in that a brake B1 is further included between the intermediate shaft CS and the transmission housing H.

The brake B1 may stop the intermediate shaft CS, the first gear set GT1, the first input shaft IS1, and the second gear set GT2, and therefore, together with the operation of the third clutch CL3, may enable the ring gear R of the planetary gear set PG to act as a fixed element. Thus, it is notable that the location of the brake B1 suffices if the ring gear R may be stopped.

Such various exemplary embodiments of the present invention differs from the various exemplary embodiments substantially in that the brake B1 is further included.

FIG. 8 is a shifting operation chart for a power transmission apparatus configured for a hybrid vehicle according to various exemplary embodiments of the present invention, and the power transmission apparatus may performs shifting operation as follows.

The brake B1 employed in the various exemplary embodiments relates to realizing the sixth forward speed FD6, and the sixth forward speed is described in detail below with reference to FIG. 8.

The first forward speed FD1 to the fifth forward speed FD5 except the sixth forward speed FD6 may be the same as in the various exemplary embodiments.

[The Sixth Forward Speed]

In the sixth forward speed FD6 of the engine mode, the engine clutch ECL, the third clutch CL3, and the brake B1 are simultaneously operated.

As such, by the operation of the brake B1, the intermediate shaft CS, the first gear set GT1, the first input shaft IS1, and the second gear set GT2 are fixed, and by the operation of the third clutch CL3, the ring gear R of the planetary gear set PG acts as a fixed element.

As such, by the operation of the engine clutch ECL, the torque of the engine ENG passes through the engine output shaft EOS, the second input shaft IS2, and the third gear set GT3, and is transmitted to the planet carrier PC of the planetary gear set PG Thus, the planetary gear set PG outputs the shifted torque to the differential DIFF through the first output shaft OS1, realizing the sixth forward speed FD6.

The sixth forward speed FD6 is described in connection with the engine mode where a vehicle is driven by the torque of the engine ENG, however, the parallel hybrid mode may also be available by merely additionally operating the motor/generator MG to supply an assistant torque.

Furthermore, when the motor/generator MG is operated while the engine clutch ECL is released and the engine ENG is stopped, a vehicle may be driven in the third forward speed FD3 in an electric vehicle mode (EV mode) by the driving torque of the motor/generator MG.

The sixth forward speed FD6 in the electric vehicle mode (EV mode) may be realized the same as in the sixth forward speed FD6 in the engine mode.

As described above, according to an exemplary embodiment of the present invention, multiple shifting stages may be realized by applying a planetary gear set to a dual clutch type transmission, and by further employing a motor/generator, an electric vehicle mode and a parallel hybrid mode may be realized to the multiple shifting stages.

Furthermore, by realizing multiple shifting stages while simplifying internal structure, shifting efficiency may be improved and an overall weight may be decreased, improving an installability and fuel consumption characteristics.

Furthermore, an electric vehicle mode and a hybrid mode may be realized by operating a motor/generator, improving fuel consumption characteristics.

Furthermore, the sixth forward speed FD6 may further realize by additionally employing a brake B1.

For convenience in explanation and accurate definition in the appended claims, the terms "upper", "lower", "inner", "outer", "up", "down", "upwards", "downwards", "front", "rear", "back", "inside", "outside", "inwardly", "outwardly", "internal", "external", "inner", "outer", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present invention have been presented for purposes of illustration and description. They are not intended to be exhaustive or to limit the present invention to the precise forms disclosed, and obviously many modifications and variations are possible in light of the above teachings. The exemplary embodiments were chosen and described to explain certain principles of the present invention and their practical application, to enable others skilled in the art to make and utilize various exemplary embodiments of the present invention, as well as various alternatives and modifications thereof. It is intended that the scope of the present invention be defined by the Claims appended hereto and their equivalents.

What is claimed is:

1. A power transmission apparatus for a hybrid vehicle, the power transmission apparatus comprising:
   a motor/generator having a rotor selectively connectable to an engine output shaft;
   a first input shaft mounted coaxial with the engine output shaft and selectively connectable to the rotor;
   a second input shaft formed as a hollow shaft, mounted coaxial with and external to the first input shaft, and fixedly connected to the rotor;
   an intermediate shaft mounted in parallel with the first input shaft;
   a first output shaft mounted in parallel with the first input shaft, receiving torques from the first and second input shafts, and outputting a shifted torque based on the received torques;
   a second output shaft mounted in parallel with the first input shaft, receiving torques from the first input shaft, and outputting a shifted torque based on the received torques;
   a planetary gear set mounted on the first output shaft, having a first rotation element fixedly connected to the first output shaft, selectively receiving torques from the first and second input shafts and the intermediate shaft, and outputting a shifted torque based on the received torques to the first output shaft; and
   a plurality of gear sets, each of which allows at least one torque flow between the first and second input shafts, the intermediate shaft, and the first output shaft and the second output shaft.

2. The power transmission apparatus of claim 1, wherein the planetary gear set is formed as a single pinion planetary gear set.

3. The power transmission apparatus of claim 1, wherein the plurality of gear sets comprise:
   a first gear set including a third gear and a second gear, the third gear being fixedly connected to the first input shaft, the second gear being fixedly connected to the intermediate shaft and gear-engaged with the third gear;
   a second gear set including a first input gear, a fourth gear, and a fifth gear, the first input gear being fixedly connected to the first input shaft, the fourth gear being rotatably mounted on the first output shaft, gear-engaged with the first input gear, and selectively connectable to a third rotation element of the planetary gear set, the fifth gear being rotatably mounted on the second output shaft, gear-engaged with the first input gear, and selectively connectable to the second output shaft;
   a third gear set including a second input gear, a first gear, and a sixth gear, the second input gear being fixedly connected to the second input shaft, the first gear being rotatably mounted on the intermediate shaft, gear-engaged with the second input gear, and selectively connectable to the intermediate shaft, the sixth gear being rotatably mounted on the first output shaft, gear-engaged with the second input gear, and fixedly connected to a second rotation element of the planetary gear set; and a fourth gear set including a final reduction gear of a differential and first and second output gears, the first output gear being fixedly connected to the first output shaft and the second output gear being fixedly connected to the second output shaft, wherein the first output gear and the second output gear are gear-engaged with the final reduction gear.

4. The power transmission apparatus of claim 3, wherein the first rotation element is a sun gear, the second rotation element is a planet carrier, and the third rotation element is a ring gear.

5. The power transmission apparatus of claim 3, further including five clutches, each of which selectively allows the at least one torque flow.

6. The power transmission apparatus of claim 5, wherein the five clutches include:
- an engine clutch mounted between the engine output shaft and the second input shaft;
- a first clutch mounted between the first gear and the intermediate shaft;
- a second clutch mounted between the first input shaft and the second input shaft;
- a third clutch mounted between the fourth gear and the third rotation element; and
- a fourth clutch mounted between the fifth gear and the second output shaft.

7. The power transmission apparatus of claim 6, wherein the fourth clutch is formed as a teeth engagement clutch.

8. The power transmission apparatus of claim 5, further including a brake between the intermediate shaft and a transmission housing.

9. The power transmission apparatus of claim 3, wherein the planetary gear set is mounted between the second gear set and the third gear set.

10. The power transmission apparatus of claim 1, wherein the plurality of gear sets include:
- a first gear set including a third gear and a second gear, the third gear rotatably mounted on the first input shaft and being selectively connectable to the first input shaft, the second gear being fixedly connected to the intermediate shaft and gear-engaged with the third gear;
- a second gear set including a first input gear, a fourth gear, and a fifth gear, the first input gear being selectively connectable to the first input shaft, the fourth gear being rotatably mounted on the first output shaft, gear-engaged with the first input gear, and selectively connectable to a third rotation element of the planetary gear set, the fifth gear being rotatably mounted on the second output shaft, gear-engaged with the first input gear, and selectively connectable to the second output shaft;
- a third gear set including a second input gear, a first gear, and a sixth gear, the second input gear being fixedly connected to the second input shaft, the first gear being rotatably mounted on the intermediate shaft, gear-engaged with the second input gear, and selectively connectable to the intermediate shaft, the sixth gear being rotatably mounted on the first output shaft, gear-engaged with the second input gear, and fixedly connected to a second rotation element of the planetary gear set; and
- a fourth gear set including a final reduction gear of a differential and first and second output gears, the first output gear being fixedly connected to the first output shaft and the second output gear being fixedly connected to the second output shaft, wherein the first output gear and the second output gear are gear-engaged with the final reduction gear.

11. The power transmission apparatus of claim 10, wherein the first rotation element is a sun gear, the second rotation element is a planet carrier, and the third rotation element is a ring gear.

12. The power transmission apparatus of claim 10,
wherein the first gear is selectively connectable to the intermediate shaft by a first synchronizer;
wherein the first input gear and the third gear are fixedly connected to each other; and
wherein the first input gear and the third gear are selectively connectable to the first input shaft by a second synchronizer.

13. The power transmission apparatus of claim 12, further including five clutches, each of which selectively allows the at least one torque flow.

14. The power transmission apparatus of claim 13, wherein the five clutches include:
- an engine clutch mounted between the engine output shaft and the second input shaft;
- a first clutch mounted between the first gear and the first synchronizer;
- a second clutch mounted between the first input shaft and the second input shaft;
- a third clutch mounted between the fourth gear and the third rotation element; and
- a fourth clutch mounted between the fifth gear and the second output shaft.

15. The power transmission apparatus of claim 14, wherein the fourth clutch is formed as a teeth engagement clutch.

16. The power transmission apparatus of claim 12, further including a brake between the intermediate shaft and a transmission housing.

17. The power transmission apparatus of claim 10, wherein the planetary gear set is mounted between the second gear set and the third gear set.

* * * * *